United States Patent Office.

CHARLES H. ROCKWELL, OF CLEVELAND, OHIO, ASSIGNOR TO THE WESTERN MINERAL WOOL AND INSULATING FIBRE COMPANY, OF NEW YORK.

PROCESS OF MANUFACTURING MINERAL WOOL.

SPECIFICATION forming part of Letters Patent No. 452,733, dated May 19, 1891.

Application filed February 7, 1891. Serial No. 380,705. (No specimens.)

*To all whom it may concern:*

Be it known that I, CHARLES H. ROCKWELL, a citizen of the United States, and a resident of Cleveland, in the county of Cuyahoga and State of Ohio, have invented certain new and useful Improvements in Processes of Manufacturing Mineral Wool, of which the following is a specification.

My invention relates to a new and useful process in the manufacture of mineral wool, whereby slag from a furnace which has become hardened by cooling may be remelted and used in the production of mineral wool.

The process by which mineral wool has heretofore been manufactured consists in taking the molten slag as it comes direct from the furnace and subjecting the same to a blast of heated steam or air by which the mineral wool is blown. This process is open to very serious objections, among which may be mentioned the following: The manufacture is dependent upon the output of the furnace, and when for any cause the operation of the furnace is suspended the manufacture of the wool must likewise cease; also, the molten slag can be obtained only at such times as the furnace is being flushed; also, a large portion of the slag becomes cooled and hardened before it has been all drawn from the car or other vessel in which it has been transported from the furnace and must be removed as useless débris.

It is well known by those familiar with the manufacture of mineral wool that it has heretofore been impossible, except with the process herein described, to produce mineral wool by the remelting of slag after it has become hardened by cooling, and that molten slag taken direct from the furnace may make good mineral wool, while the same slag being remelted after it has become hardened by cooling, will not.

My process consists in mixing with the hardened slag lime or silica, or both, as the case may require, melting the mixture in a cupola and converting the product of such melting into mineral wool in the usual way.

I have heretofore been allowed a patent upon the process of manufacture of such wool, consisting of melting hardened slag with lime and silica or with lime alone, application for which was filed February 21, 1888, Serial No. 264,818, allowed January 20, 1891, and the present application is intended to cover that feature of the process which consists of melting in a cupola a mixture of the hardened slag with silica.

The proportion of silica to be used depends upon the character of the slag. In practice I have found that ninety-five per cent. of slag and five per cent. of silica or silica-bearing stone produces a good result; but I do not intend to confine myself to the exact proportions mentioned. The amount of silica to be used can be easily ascertained by a few inexpensive trials. By the use of my new process it is possible to produce a continuous output of mineral wool day and night independent of the action of the furnace. The hardened slag which has heretofore been discarded as worthless is utilized. The process is cheaper and the product obtained is a better class of wool and more uniform in quality.

The product obtained by this process is to be distinguished from what is known as "rock wool," which is obtained by melting rock containing lime and silica, which is a different product and of much greater cost.

The principal features of value of my invention consist in the use of the hardened slag, which can usually be obtained in unlimited quantities and without cost, and the securing a constant output independent of the action of the furnace producing the slag.

What I claim, and desire to secure by Letters Patent, is—

In the manufacture of mineral wool, the process consisting in melting in a cupola hardened slag or scoria with silica or silica-bearing stone, mixed in proper proportions and converting the same into mineral wool, substantially as described.

Signed at New York, in the county of New York and State of New York, this 3d day of February, A. D. 1891.

CHAS. H. ROCKWELL.

Witnesses:
CHAS. A. HESS,
W. J. TOWNSEND.